US008147185B2

(12) United States Patent  (10) Patent No.: US 8,147,185 B2
Ren  (45) Date of Patent: Apr. 3, 2012

(54) SYSTEMS, METHODS, AND APPARATUS FOR CONTROLLING GAS LEAKAGE IN A TURBINE

(75) Inventor: Wei-Min Ren, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 584 days.

(21) Appl. No.: 12/357,931

(22) Filed: Jan. 22, 2009

(65) Prior Publication Data

US 2010/0183439 A1 Jul. 22, 2010

(51) Int. Cl.
 *F01B 25/00* (2006.01)
 *F01D 13/02* (2006.01)
 *F01D 17/00* (2006.01)
 *F03D 7/00* (2006.01)
 *F04D 27/00* (2006.01)
(52) U.S. Cl. ........................................ 415/144; 415/229
(58) Field of Classification Search .................. 415/144, 415/229, 230
 See application file for complete search history.

(56) References Cited

U.S. PATENT DOCUMENTS

2002/0119040 A1* 8/2002 Bosley ............................. 415/72
2008/0279687 A1* 11/2008 Hofmann ......................... 416/85

\* cited by examiner

*Primary Examiner* — Chuong A Luu
*Assistant Examiner* — Nga Doan
(74) *Attorney, Agent, or Firm* — Sutherland Asbill & Brennan LLP

(57) ABSTRACT

Systems, methods and apparatus for controlling gas leakage in a turbine are provided. A plurality of seals may be provided in series, where each of the plurality of seals may be operable to reduce gas backflow from an inlet of a turbine component. Further, one or more channels may be provided that are operable to direct at least a portion of the gas backflow from respective points within the plurality of seals to corresponding points within a gas flow path of the turbine. The at least a portion of the gas backflow may be directed to the points within the gas flow path through the one or more channels. Additionally, the diameters of the plurality of seals may be optimized to at least partially balance the net thrust generated by the gas flow path of the turbine.

20 Claims, 4 Drawing Sheets

SYSTEMS, METHODS, AND APPARATUS FOR CONTROLLING GAS LEAKAGE IN A TURBINE

FIELD OF THE INVENTION

Embodiments of the invention relate generally to turbines and more specifically, to systems, methods, and apparatus controlling gas leakage in turbines.

BACKGROUND OF THE INVENTION

A turbine typically includes a plurality of turbine stages arranged in series. Each stage often includes a rotating component and a stationary component. Energy is extracted from the gas flow path in each of these stages, and is converted into rotational energy of the rotating component, leading to a pressure drop across each of the individual stages. This pressure drop across each of the individual stages gives rise to a net thrust within the turbine. It is often desirable to balance the thrust produced in order to reduce the mechanical stresses on the turbine.

Moreover, the extraction of the energy from the various stages is accompanied by losses in each of the individual stages, individual casings and the entire turbine. For example, in a casing associated with a high pressure (HP) stage of a turbine, losses may occur in the form of end and inter-stage leakages. Leakages may be gas flows, such as steam flows, that bypass either stationary or rotating turbine components. Leakage flows include, for example, flows through leakage control devices such as inter stage packings or end packings, tip spills, and leakages past expansion joints, stationary blade carrier seals or leakages along horizontal joints. The leakage flows reduce the amount of flow in the steam path, leading to a reduction in the amount of work done by the flow, in turn affecting the performance of the turbine.

The leakage flows often lead to degradations in turbine performance. Attempts have been made to reduce or minimize the leakage flows within a turbine. For example, attempts have been made to minimize the leakage passage by minimizing the packing seal diameter and/or the clearances between the rotating and the stationary components of the turbine in the different stages of the turbine. While these attempts may result in a decrease in the leakage flows, a relatively significant leakage flow may remain in the turbine.

Accordingly, there is a need for methods, systems and apparatus for controlling gas leakage in a turbine.

BRIEF DESCRIPTION OF THE INVENTION

According to one embodiment of the invention, there is disclosed a method for controlling end gas leakage in a turbine. The method may include providing a plurality of seals in series to reduce gas backflow from an inlet of a turbine. The method may further include providing one or more channels that direct at least a portion of the gas backflow from respective points within the plurality of seals to corresponding points within a gas flow path of the turbine. The portion of the gas backflow may be directed to the points within the gas flow path through the one or more channels.

According to another embodiment of the invention, there is disclosed a system for controlling gas leakage in a turbine. The system may include a plurality of seals and one or more channels. The plurality of seals may be arranged in series, where each of the plurality of seals may be operable to reduce gas backflow from an inlet of a turbine. The one or more channels may be operable to direct at least a portion of the gas backflow from respective points within the plurality of seals to corresponding points within a gas flow path of the turbine.

According to yet another embodiment of the invention, there is disclosed a turbine. The turbine may include a casing, a turbine component, an inlet, a plurality of seals, and one or more channels. The casing may surround or envelope the turbine component. The turbine component may include a rotor and a plurality of rotating blades extending from the rotor. The turbine component may be in flow communication with the inlet, and the inlet may provide a gas flow to the turbine component. The plurality of seals may be arranged in series proximate to the inlet, and the plurality of seals may be operable to reduce gas backflow. The one or more channels may be operable to direct at least a portion of the gas backflow from respective points within the plurality of seals to corresponding points within a gas flow path of the turbine component.

Other embodiments, aspects, and features of the invention will become apparent to those skilled in the art from the following detailed description, the accompanying drawings, and the appended claims.

BRIEF DESCRIPTION OF THE DRAWINGS

Figure 1:
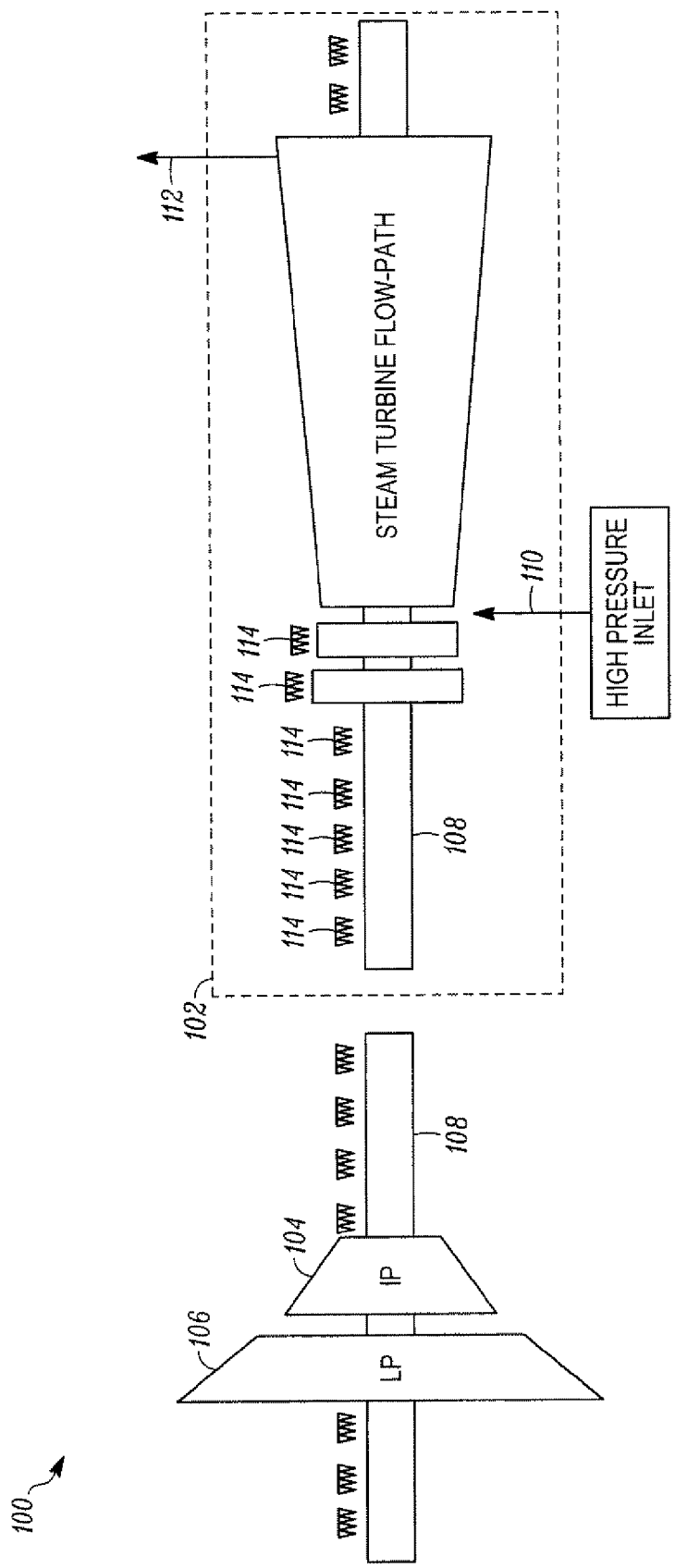

Having thus described the invention in general terms, reference will now be made to the accompanying drawings, which are not necessarily drawn to scale, and wherein:

FIG. 1 is a schematic view of one example steam turbine that may be utilized in accordance with various embodiments of the invention.

Figure 2:
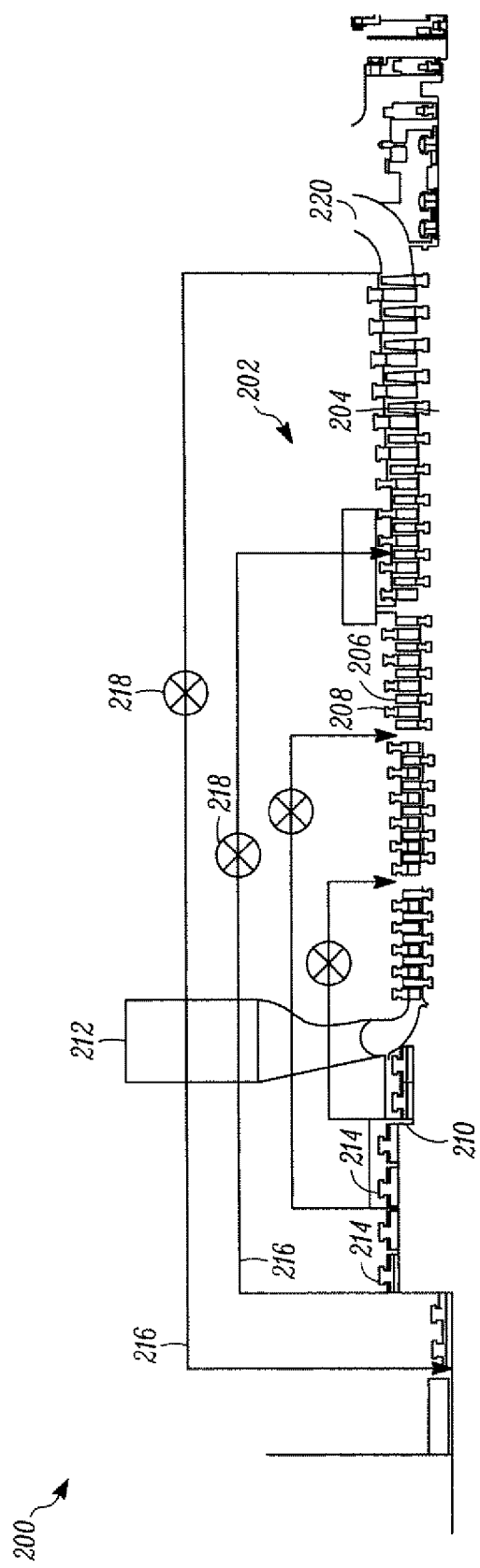

FIG. 2 is a cross-sectional view of an example portion of a steam turbine in which gas leakage may be controlled, in accordance with an illustrative embodiment of the invention.

Figure 3:
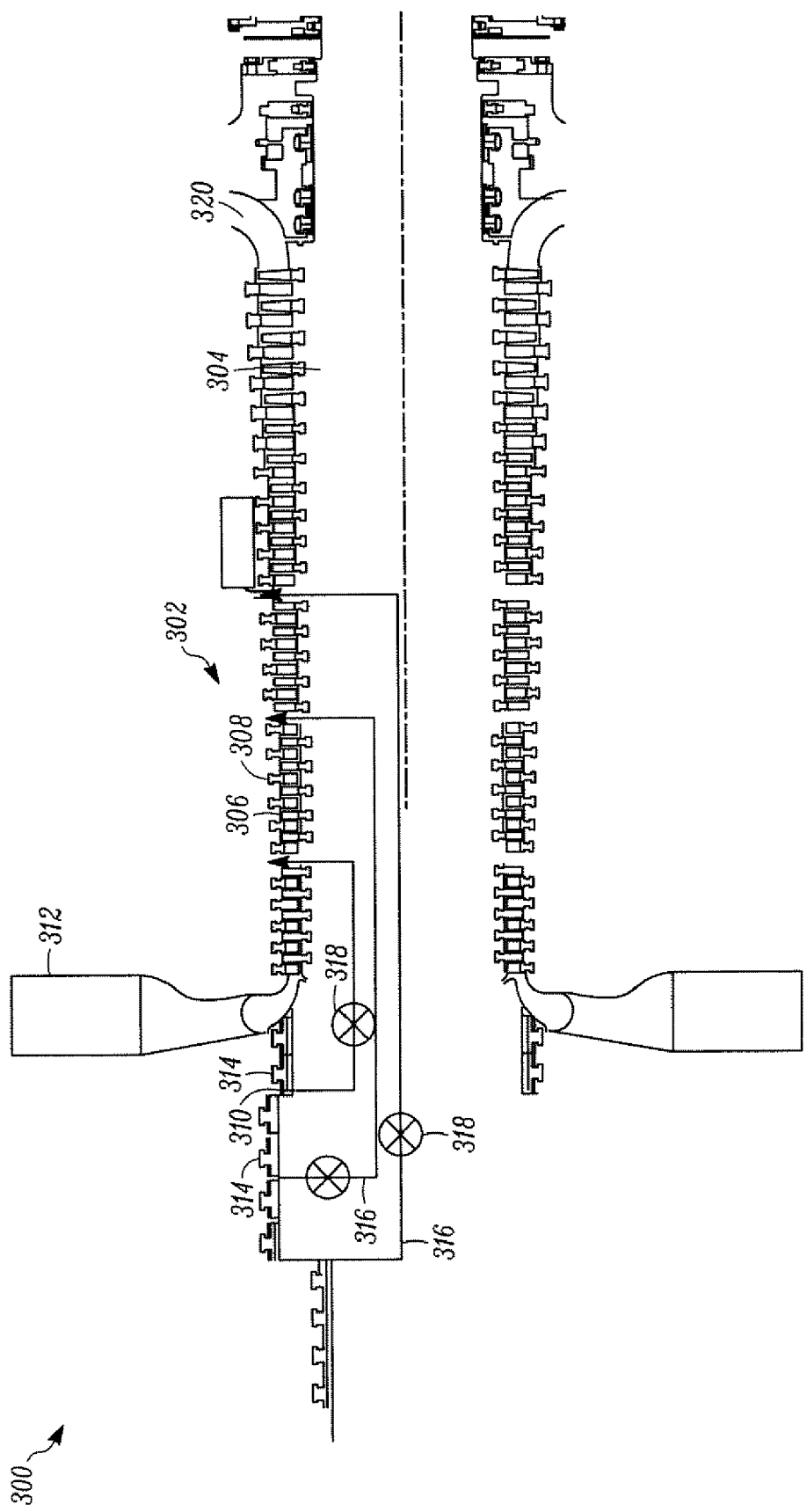
Figure 4:
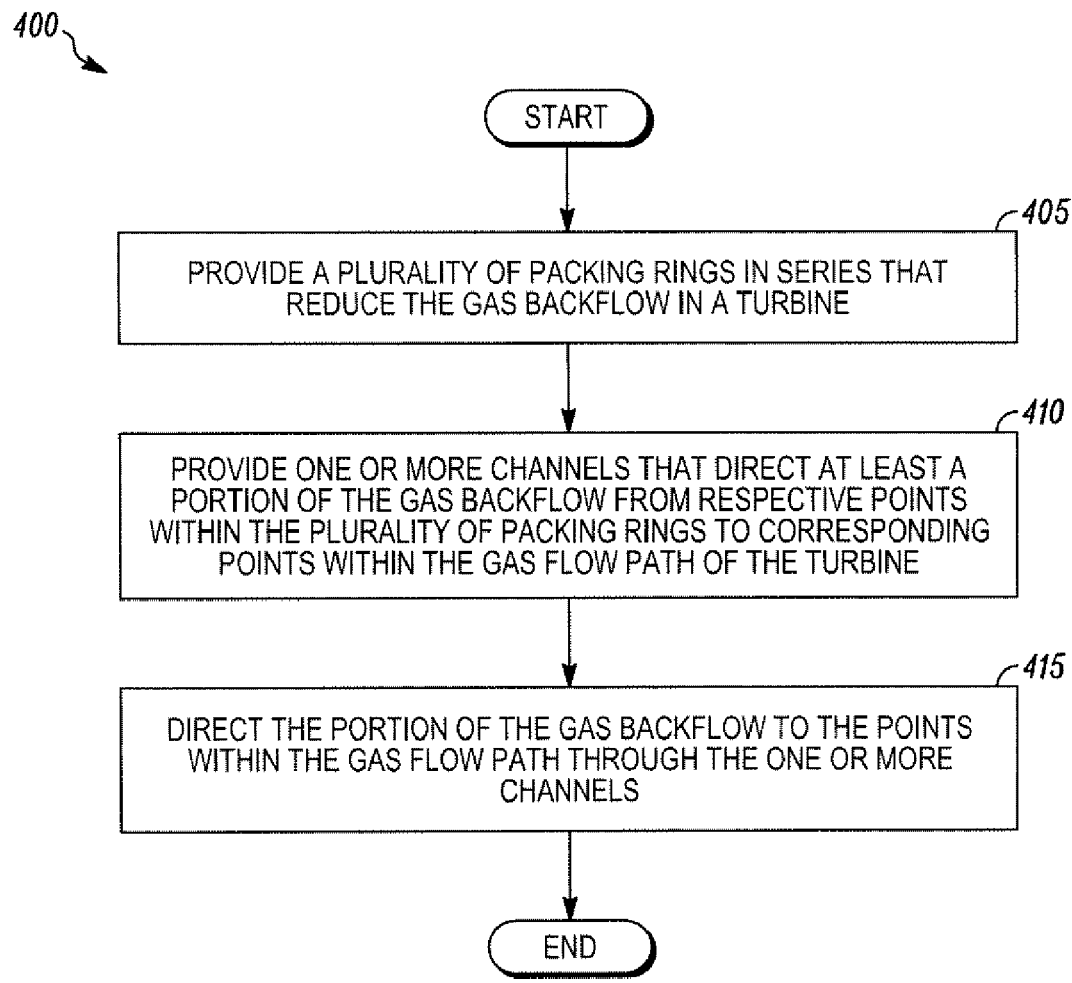

FIG. 3 is a cross-sectional view of another example portion of a steam turbine in which gas leakage may be controlled, in accordance with another illustrative embodiment of the invention FIG. 4 is a flowchart illustrating one example method for controlling gas leakage in a turbine, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems, methods and apparatus for controlling gas leakage in a turbine. Various embodiments of the invention may include a plurality of seals arranged in series and operable to receive a gas backflow in one or more components of a turbine. In certain embodiments, the plurality of seals may include a plurality of packing rings. The pressure of the gas backflow may be reduced as the gas backflow flows across the plurality of seals or packing rings. The plurality of seals may be placed or situated proximate to the inlet of the turbine component and may be in flow communication with one or more channels. The one or more channels may be operable to direct at least a portion of the gas backflow from respective points within the plurality of seals to corresponding points in the gas flow path of the turbine. This re-injection of a portion of the gas backflow into the gas flow path may improve the performance and efficiency of the turbine. Additionally, the plurality of packing rings may be designed at various packing diameters to facilitate the generation of a thrust across the plurality of seals. The generated thrust may at least partially balance the thrust generated within the turbine component.

The technical effect of embodiments of the invention described herein is that a plurality of seals may be provided or arranged in series to balance the thrust load generated by the gas flow in a turbine component. This configuration may eliminate the need to utilize large thrust bearings or balance pistons in association with the turbine component. Additionally, the plurality of seals may be operable to reduce the backflow of the gas from the relatively higher pressure inlet of the turbine component. A portion of the backflow that may leak from the inlet of the turbine component across the plurality of seals may be directed back into the gas flow path of the turbine component through one or more channels. Thus the leakage backflow is not allowed to go to waste and is directed back to the turbine component to produce work in the turbine component. Thus the use of the plurality of seals may have the technical effect of improving the performance and at the same time ensuring the stability of the turbine component.

FIG. 1 is a schematic view of one example steam turbine 100 that may be utilized in accordance with various embodiments of the invention. FIG. 1 presents an overview of the structure of one example steam turbine 100, which may be used in a variety of applications, for example, power generation applications. The example steam turbine 100 illustrated in FIG. 1 includes three primary sections: a high pressure (HP) section 102, an intermediate pressure (IP) section 104, and a low pressure (LP) section 106. Each of the HP section 102, the IP section 104 and the LP section 106 may be surrounded by one or more pressure casings (not shown in figure), and may be further coupled through a common rotor 108 which may be operably connected to a generator (not shown in figure) for electric power generation. Further, each of the HP section 102, the IP section 104 and the LP section 106 may include one or more stages disposed along the rotor 108. The one or more stages may each include a plurality of fixed blades forming a nozzle, and a plurality of rotating blades (not shown in figure) extending from the rotor 108. In various embodiments of the invention, the rotor 108 may include a variable cross-section to improve the efficiency of the steam turbine 100. Any number of sections and/or stages may be included in turbines that utilize various embodiments of the invention. Additionally, various embodiments of the invention may be utilized in association with a wide variety of different turbines or other machines, for example, steam turbines, gas turbines, etc.

In the steam turbine 100 shown in FIG. 1, incoming steam may drive a turbine component in the HP section 102 of the turbine 100. At least a part of the outgoing steam of the HP section 102 may be discharged to a re-heater (not shown in figure) and then may be sent to the IP section 104, and subsequently to the LP section 106, losing pressure as the steam moves from one section of the turbine 100 to another. The loss in pressure across the inlet and exit of each section may generate a thrust in each section along the direction of steam flow. The loss in pressure may be most pronounced in the HP section 102 of the turbine 100, thus giving rise to a relatively greater thrust as compared with the other two sections.

The steam turbine 100 may receive steam at a relatively high temperature and a relatively high pressure from a boiler (not shown in figure). The incoming steam may enter the HP section 102 of the steam turbine 100 through an inlet 110 whereupon the incoming steam may be guided through nozzles onto the rotating blades of the rotor 108 to produce rotational energy. In one example embodiment, the incoming steam may impart the rotor 108 a rotational speed of approximately 3600 (revolutions/min). The generation of rotational energy may be associated with a loss in pressure and temperature of the incoming steam across the HP section 102 of the turbine 100. Thus, the outgoing steam through the exit 112 of the HP section 102 may be relatively cooler and may be at relatively lower pressure as compared to the incoming steam. In certain embodiments of the invention, at least a part of the outgoing steam may enter the boiler for reheating, while the remaining part may be directed to the IP section 104 for cooling purposes. Additionally, the reheated steam from the boiler may be further directed to the inlet of the IP section 104.

Further, the reheated steam after entering die IP section 104 at a relatively lower pressure may perform work on the rotor 108 and subsequently may be discharged through the outlet into the LP section 106.

During operation of the steam turbine 100, the rotor 108 may penetrate the pressure boundary of the casings surrounding one or more sections of the steam turbine 100. Consequently, the casing may be sealed at the points of penetration to prevent the escape of steam from the casing at locations, where the casing pressure exceeds the ambient pressure, and to prevent the leakage of air into the casing, where the casing pressure is below ambient pressure. Thus, a plurality of seals 114 may be employed about the rotor 108 as desired in various embodiments of the invention. In one example embodiment, a plurality of seals 114 may be provided proximate to a relatively high pressure inlet of a section of a steam turbine 100 (e.g., HP section, IP section) to prevent relatively high pressure steam from escaping the section. Further, any number of seals may also be provided at the low pressure exit of the section as desired to prevent ambient air from entering the section of the steam turbine 100.

FIG. 2 is a cross-sectional view of an example portion 200 of a steam turbine in which gas leakage may be controlled, in accordance with an illustrative embodiment of the invention. Although FIG. 2 shows a HP section 202 of a steam turbine, such as steam turbine 100 illustrated in FIG. 1, the embodiments of the invention described with reference to FIG. 2 may be applicable to different turbines which include, but are not limited to, gas turbines, steam turbines etc., and may also be applicable to different sections of a turbine, such as, a high pressure (HP) section, an intermediate-pressure (IP) section, and a low pressure (LP) section.

With reference to FIG. 2, the HP section 202 of a steam turbine may include a rotating component, such as a rotor 204, enclosed in a stationary component, such as a casing (not shown in figure). A plurality of rotating turbine blades 206 may be mounted on the rotor 204, and may extend radially towards the casing. These rotating turbine blades 206 may be placed between adjacent rows of stationary stator blades 208, which extend radially inward from the casing and towards the rotor 204. In certain embodiments, the rotor 204 may have variable cross-sectional area with at least one radial step 210 placed along the axis of the rotor 204. During normal operation, steam may enter the steam turbine from a boiler (not shown in figure) and into the HP section 202 through an HP inlet 212. The incoming steam may have a relatively high pressure. In one example embodiment, the incoming steam may have a pressure of approximately 2000 psi. The incoming steam may accelerate while passing through the stationary stator blades 208, and subsequently expand as it passes through the rotating turbine blades 206. The stationary stator blades 208 may be operable to convert the potential energy of the incoming steam into kinetic energy, and direct the accelerated flow onto the rotating turbine blades 206. Thereafter, the rotating turbine blades 206 may convert the kinetic energy of the flow into impulse and reaction forces, giving rise to a pressure drop across the rotating turbine blades 206, and thus resulting in rotation of the rotor 204. This pressure drop may give rise to a thrust in the direction of the steam flow.

Moreover, a compensating thrust may be generated by within the turbine component 200. The compensating thrust may be generated by various radial steps between packing ring or seal diameters and an inner root diameter of the steam path. Accordingly, a plurality of seals 214 may be employed proximate to the HP inlet 212, and in a direction opposite to the steam flow, to adjust the compensating thrust to at least partially balance the thrust produced by the steam flow along the steam flow path. In some embodiments, the plurality of seals 214 may facilitate an approximate balancing of the compensating thrust to the thrust produced by the steam flow along the steam flow path. In certain embodiments of the invention, the plurality of seals 214 may include a plurality of packing rings. Any number of packing rings may be utilized as desired in various embodiments of the invention. For example, as shown in FIG. 2, the plurality of seals 214 may include four packing rings. Each of the packing rings may have a respective radius. For example, the four packing rings may respectively have radii of R1, R2, R3 and R4. Additionally, in certain embodiments, the packing rings may be arranged or placed in series to facilitate the balancing of the thrust produced by the steam flow, and additionally to reduce the steam backflow from the HP inlet 212 of the HP section 202. Since the step area associated with the radial step 210 is the radii difference between R1 and R2, the compensating thrust produced may be controlled by the radius R1, R2, R3 and R4 of the seals 214. The compensating thrust may be defined as the sum of the product of the pressure drop across each of the plurality of seals and the step area between any two adjacent seals. As desired in various embodiments of the invention, the compensating thrust may be adjusted by adjusting the radii of the seals 214.

Additionally each of the plurality of seals 214 may be in flow communication with one or more channels 216 within the casing of the steam turbine operable to direct the steam backflow from respective points within the plurality of seals 214 to corresponding pressure points downstream of the steam or gas flow path. In one example embodiment, the backflow pressure at one of the respective points within the plurality of seals 214 may be approximately equal to the pressure of the steam flow path at a corresponding point within the steam flow path. As desired in certain embodiments of the invention, the corresponding pressure points within the gas flow path may be points associated with different stages of the HP section 202 where the pressure may be approximately equal to that at the respective points within the plurality of seals 214. For example, the pressure of the backflow at a first point in the plurality of seals 214 (e.g., the outlet of a first packing ring) may be approximately equal to the pressure of the steam in the gas flow path of the turbine component at a corresponding point within the gas flow path. A portion of the backflow at the first point in the plurality of the seals may flow through a channel and be reintroduced into the gas flow path of the turbine component 200 at a corresponding point in the gas flow path with a similar pressure. In this regard, at least a portion of the backflow may be captured and reintroduced into the gas flow path of the turbine component 200. This re-injection of the leakage steam downstream of the steam flow path at different stages of the HP section 202 at relatively lower pressures may be operable to increase the work done by the steam in these stages, and to in turn improve the overall efficiency of the steam turbine.

In various embodiments of the invention, one or more channels may be provided to re-inject a portion of the gas backflow into the gas flow path. For example, a channel may be provided between a respective point in the plurality of seals 214 and a corresponding point in the gas flow path. One example of the one or more channels 216 that may be utilized for directing the backflow or leakage steam through the casing may be pipes or other gas flow passages circumferentially spaced about the casing of the steam turbine. Moreover, the one or more channels 216 may include at least one valve 218 which may be selectively opened to permit steam to be re-injected into the gas flow path. For example, the at least one valve 218 may be opened when the steam turbine achieves steady state operation.

Moreover, the number of seals 214 provided proximate to the inlet 212 may vary depending on the length of the HP section 202. The total length of the HP section 202 being fixed, an increase in the number of seals 214 would lead to a decrease in the number of stages in the HP section 202. Hence, even though an increase in the number of seals 214 is operable to reduce the leakage flows, a decrease in the number of stages may reduce the expansion work done in the HP section 202. Alternatively, although an increase in the number of stages would increase the work done in the HP section 202, reducing the number of seals 214 would mean increased leakage flow and loss in efficiency of the steam turbine. Thus, in example embodiments, approximately four to approximately six seals may provide optimum performance of the steam turbine.

The steam after flowing through the entire HP turbine section 202 may be discharged at the low pressure exit 220 of the HP turbine section 202 at a relatively lower temperature and pressure compared to the incoming steam. In one example embodiment, the outgoing steam at the low pressure exit 220 may have a pressure of approximately 600 psi. Part of the outgoing steam may be discharged to the boiler for reheating while the remaining part may be directed to the IP section (not shown in figure) for cooling purposes.

FIG. 3 is a cross-sectional view of a portion of a steam turbine 300 in which gas leakage may be controlled in accordance with another illustrative embodiment of the invention. The steam turbine component 300 comprises a casing (not shown in figure), which includes a HP section 302 with a plurality of turbine stages, and a rotating component. The embodiments of the invention described with reference to the HP section 302 of the steam turbine component 300 shown in FIG. 3 are by example only, and the systems and methods described with reference to FIG. 3 may be applicable to different types of turbines such as gas turbines, steam turbines etc., and may also be applicable to different sections of a steam turbine, such as a high pressure (HP) section, an intermediate pressure (IP) section and a low pressure (LP) section.

With reference to FIG. 3, the rotating component, such as a rotor 304, enclosed in the casing may include a plurality of rotating turbine blades 306 mounted on the rotor 304, and extending radially towards the casing. Each of the turbine stages of the HP section 302 may comprise at least one set of the rotating turbine blades 306 placed between adjacent rows of stationary stator blades 308, extending radially inward from the casing and towards the rotor 304. In certain embodiments, the rotor 304 may have variable cross-sectional area with at least one radial step 310 placed along the axis of the rotor 304. During normal operation, steam may enter the turbine component 300 from an associated boiler and into the HP section 302 through a HP inlet 312. In each turbine stage, the incoming steam may accelerate through the stationary stator blades 308, and subsequently expand as it passes through the rotating turbine blades 306. The stationary stator blades 308 in each stage may be operable to convert the potential energy of the incoming steam into kinetic energy, and direct the accelerated flow onto the rotating turbine blades 306. Thereafter, the rotating turbine blades 306 may convert the kinetic energy of the flow into impulse and reaction forces giving rise to a pressure drop across the rotating turbine blades 306, thus resulting in rotation of the rotor 304. This pressure drop in each stage may generate a thrust in the direction of the steam flow.

Moreover, a compensating thrust may be generated by within the turbine component 300. In certain embodiments, the compensating thrust may be generated by various radial steps between packing seal diameters and an inner root diameter of the steam-path. Accordingly, a plurality of seals 314 may be employed proximate to the HP inlet 312, and in a direction opposite to the steam flow, to adjust the compensating thrust to at least partially balance the thrust produced by the steam along the direction of the steam flow path. In certain embodiments, the compensating thrust may approximately balance the thrust produced by the steam along the direction of the steam flow path. In one example configuration shown in FIG. 3, the seals 314 may be placed in series to balance the thrust produced by the steam flow, and additionally to reduce the steam backflow from the HP inlet 312 of the HP section 302. The compensating thrust may depend on the radii of the seals 314. Thus the thrust balancing of the HP section 302 of the steam turbine may be achieved by optimizing the radius of the seals 314.

Additionally each of the seals 314 may be in flow communication with one or more channels 316 within the rotor of the turbine component 300, and may be operable to direct the steam backflow from respective points within the seals 314 to corresponding pressure points in the gas flow path of the HP section 302. In one example embodiment, the backflow pressure at one of the respective points within the seals 314 may be approximately equal to the pressure of the steam flow path at a corresponding point within the gas flow path. The corresponding pressure points within the gas flow path may be points associated with different stages of the HP section 302 where the pressure may be approximately equal to that at respective points within the seals 314. For example, the pressure of the backflow at a first point in the plurality of seals 314 (e.g., the outlet of a first seal) may be approximately equal to the pressure of the steam in the gas flow path of the turbine component at a corresponding point within the gas flow path. A portion of the backflow at the first point in the plurality of the seals may flow through a channel and be reintroduced into the gas flow path of the turbine component 300 at a corresponding point in the gas flow path with a similar pressure. In this regard, at least a portion of the backflow may be captured and reintroduced into the gas flow path of the turbine component 300. This re-injection of the leakage steam downstream of the steam flow path at different stages of the HP section 302 at relatively lower pressures may be operable to increase the work done by the steam in these stages, and to in turn improve the overall efficiency of the turbine component 300. One example of the channels 316 used for directing the backflow or leakage steam through the rotor 304 may be grooves or other gas flow passages circumferentially spaced inside the rotor 304 of the turbine component 300. Moreover, the one or more channels 316 may include at least one valve 318 which may be closed initially when the steam turbine is started, and may be selectively opened to permit steam to be re-injected into the gas flow path only when a steady state operation is achieved.

Moreover, the number of seals 314 provided proximate to the inlet 312 may depend on the length of the HP section 302. The total length of the HP section 302 being fixed, an increase in the number of seals 314 would limit the number of stages in the HP section 302. Hence, although the configuration may reduce the leakage flow, a decrease in expansion work done in the HP section 302 may result thus affecting the performance of the engine. Alternatively, although a configuration with an increased number of stages may increase the work done in the HP section 302, reduction in the number of seals 314 may give rise to increased leakage flow and losses thus affecting the performance of the steam turbine 300. Thus in example embodiments, a configuration employing approximately four to approximately six seals may provide optimum performance of the steam turbine 300.

The steam after flowing through the entire HP turbine section 302 may be discharged at the low pressure exit 320 of the HP turbine section 302 at a relatively lower temperature and pressure compared to the incoming steam. A part of the outgoing steam may be discharged to the boiler for re-heating while the remaining part may be directed to the IP section (not shown in figure) for cooling purposes.

FIG. 4 is a flowchart illustrating one example method 400 for monitoring a turbine, according to an illustrative embodiment of the invention.

The method 400 may begin at block 405. At block 405, a plurality of packing rings in series may be provided to reduce the gas backflow from an inlet of a turbine. The turbine may include a casing which envelopes a turbine component comprising a rotating assembly such as a rotor. A portion of the flow of gas through the high pressure inlet of the turbine component may flow in a direction opposite to the gas flow path. Thus, a plurality of packing rings in series may be employed proximate to the HP inlet of the turbine and opposite to the gas flow path to reduce the gas backflow by providing a torturous path to the backward gas flow. Additionally, the radius of the packing rings may be adjusted/optimized to generate a compensating thrust to balance the thrust generated by the gas flow path. In one example embodiment, approximately four to approximately six packing rings may be employed to generate the compensating thrust and reduce the backward gas flow. Following the arrangement of packing rings in series to reduce the gas back flow from the high pressure inlet, operations may proceed to block 410.

At block 410, one or more channels may be provided that may direct at least a portion of the gas backflow from respective points within the plurality of packing rings to corresponding points within the gas flow path of the turbine. The packing rings arranged in series at block 405 may be in flow communication with one or more channels. In one example embodiment, the one or more channels may be provided within the casing of the turbine. In other embodiments, the one or more channels may be provided within the rotor of the turbine. Further, the one or more channels may be operable to direct the leakage flow from the respective points within the plurality of packing rings to the corresponding points or stages in the gas flow path. This re-injection of the leakage flow through the one or more channels facilitates an increase in work done in the different stages of the turbine, thus improving the overall power generated by the turbine. The amount of work done by the leakage flows in the different stages of the turbine may depend on the pressure of the stage where the leakage flow is re-injected into the gas flow path. Following the use of one or more channels to direct the leakage flow back into the gas flow path, operations may continue at block 415.

At block 415, the portion of the gas backflow is directed to the points within the gas flow path through the one or more channels. The portion of gas which backflows due to the high pressure at the inlet of the turbine component may be directed by one or more channels from respective points within the packing rings to corresponding points in the gas flow path.

The method 400 may end following block 415.

The operations described in the method 400 of FIG. 4 do not necessarily have to be performed in the order set forth in FIG. 4, but instead may be performed in any suitable order. Additionally, in certain embodiments of the invention, more or less than all of the elements or operations set forth in FIG. 4 may be performed.

Embodiments of the invention may be applicable to different types of turbines such as steam turbine, gas turbine and the like. Moreover the embodiments of the invention may also be used within different sections of a turbine such as high pressure section, intermediate pressure section and low pressure section of a steam turbine. It will be apparent that any example taken/provided in the foregoing specification is merely provided for explanation purposes and does not limit the scope of the invention by any means.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The claimed invention is:

1. A method for controlling gas leakage in a turbine, the method comprising:
    providing a plurality of seals in series to reduce gas backflow from an inlet of a turbine;
    providing one or more channels that direct at least a portion of the gas backflow from respective points within the plurality of seals to corresponding points within a gas flow path of the turbine; and
    directing the portion of the gas backflow to the points within the gas flow path through the one or more channels.

2. The method of claim 1, further comprising:
    balancing a net thrust generated by the plurality of seals with a net thrust generated by the gas flow path of the turbine.

3. The method of claim 2, wherein balancing a net thrust generated by the plurality of seals with a net thrust generated by the flow path of the turbine comprises:
    adjusting a respective radius associated with each of the plurality of seals.

4. The method of claim 1, wherein providing one or more channels comprises providing one or more channels within a casing of the turbine.

5. The method of claim 1, wherein providing one or more channels comprises providing one or more channels within a rotor of the turbine.

6. The method of claim 1, wherein the gas backflow pressure at one of the respective points within the plurality of seals is approximately equal to a pressure of the gas flow path at a corresponding point within the gas flow path.

7. The method of claim 1, wherein providing a plurality of seals comprises providing approximately four to approximately six seals.

8. A system for controlling gas leakage in a turbine, the system comprising:
    a plurality of seals arranged in series, wherein each of the plurality of seals is operable to reduce gas backflow from an inlet of a turbine; and
    one or more channels operable to direct at least a portion of the gas backflow from respective points within the plurality of seals to corresponding points within a gas flow path of the turbine.

9. The system of claim 8, wherein a net thrust generated by the plurality of seals is at least partially balanced with a net thrust generated by the gas flow path of the turbine.

10. The system of claim 9, wherein the approximate balancing is facilitated by adjusting a respective radius associated with each of the plurality of seals.

11. The system of claim 8, wherein the one or more channels comprise one or more channels within a casing of the turbine.

12. The system of claim 8, wherein the one or more channels comprise one or more channels within a rotor of the turbine.

13. The system of claim 8, wherein the gas backflow pressure at one of the respective points within the plurality of seals is approximately equal to a pressure of the gas flow path at a corresponding point within the gas flow path.

14. The system of claim 8, wherein the plurality of seals comprises approximately four to approximately six seals.

15. A turbine, comprising:
    a casing;
    a turbine component comprising a rotor and a plurality of rotating blades extending from the rotor;
    an inlet that provides a gas flow to the turbine component;
    a plurality of seals arranged in series and operable to reduce gas backflow; and
    one or more channels operable to direct at least a portion of the gas backflow from respective points within the plurality of seals to corresponding points within a gas flow path of the turbine component.

16. The turbine of claim 15, wherein a net thrust generated by the plurality of seals is at least partially balanced with a net thrust generated by the gas flow path of the turbine.

17. The turbine of claim 15, wherein the approximate balancing is facilitated by adjusting a respective radius associated with each of the plurality of seals.

18. The turbine of claim 15, wherein the one or more channels comprise one or more channels within the casing of the turbine.

19. The turbine of claim 15, wherein the one or more channels comprise one or more channels within the rotor of the turbine.

20. The turbine of claim 15, wherein the gas backflow pressure at one of the respective points within the plurality of seals is approximately equal to a pressure of the gas flow path at a corresponding point within the gas flow path.

* * * * *